United States Patent [19]

Sterling

[11] 4,080,155
[45] Mar. 21, 1978

[54] SWITCHING DEVICES FOR PHOTOFLASH UNIT

[75] Inventor: Vaughn C. Sterling, Cleveland Heights, Ohio

[73] Assignee: General Electric Company, Schenectady, N.Y.

[21] Appl. No.: 778,993

[22] Filed: Mar. 18, 1977

[51] Int. Cl.² .............................................. A21D 13/00
[52] U.S. Cl. .................................. 431/95 A; 252/501; 252/518; 362/13
[58] Field of Search .......................... 431/95; 240/1.3; 252/506, 510, 514, 518, 501; 200/3

[56] References Cited
U.S. PATENT DOCUMENTS

| 3,951,582 | 4/1976 | Holub et al. | 252/506 |
| 3,988,647 | 10/1976 | Bolon et al. | 240/1.3 |
| 3,989,644 | 11/1976 | Bolon et al. | 252/512 |
| 3,990,832 | 11/1976 | Smialek et al. | 338/15 |
| 3,990,833 | 11/1976 | Holub et al. | 252/514 |

*Primary Examiner*—William F. O'Dea
*Assistant Examiner*—Robert J. Charvat
*Attorney, Agent, or Firm*—John F. McDevitt; Lawrence R. Kempton; Frank L. Neuhauser

[57] ABSTRACT

An improved static solid switching device is disclosed for activation by radiant energy when a flash lamp located adjacent thereto is flashed. The multiple flash lamp array having a plurality of lamps fired individually and in sequence for use with said improved static solid switching devices is further disclosed. The switches are prepared from compositions which include the presence of a non-conductive particulate solid to provide improvement in switch manufacture as well as switch operation.

10 Claims, 4 Drawing Figures

SWITCHING DEVICES FOR PHOTOFLASH UNIT

RELATED PATENT APPLICATION

Patent application Ser. No. 751,537, Green et al, filed Dec. 16, 1976, and assigned to the present assignee, discloses an electrically insulative adhesive coating for use with underlying radiation-sensitive switching devices and in a photoflash unit of the same type herein provided.

BACKGROUND OF THE INVENTION

The present invention is in the general field of multiple photoflash lamp arrays, such as flashcubes and planar arrays, adapted to be temporarily attached to a camera capable of producing a plurality of flashes for taking a plurality of pictures. A known flash lamp unit of this type utilizes an arrangement of two rows of four lamps, one above the other, with the individual flash lamps being electrically connected in such a way that fires the upper group of four lamps. By turning said arrangement 180° and reinserting a second electrical connector for the circuitboard member of the flash lamp unit into the flash lamp socket, the remaining group of four flash lamps can be ignited and such an arrangement eliminates or reduces the undesirable "red eye" effect. This type photoflash unit is described in U.S. Pat. No. 3,937,946, K. H. Weber, which is assigned to the assignee of the present invention.

Suitable static solid switching devices for use in a flash lamp unit of this type are also known. As previously indicated, each switch is activated by the radiant energy generated during flashing of the flash lamp located adjacent thereto to convert such switch from a high electrical resistance ("off" condition) by undergoing chemical reaction to a conductive state ("on" condition) of low electrical resistance. These switches are suitably interconnected in the flash-sequencing circuit employed in the photoflash unit to provide a low resistance circuit path to another unflashed lamp. A solid static switch which operates in this manner is described and claimed in U.S. Pat. No. 3,990,833, Holub et al, and simply comprises a mass of a composition comprising silver oxide, a carbon-containing silver salt and a humidity resistant organic polymer binder. A static solid switching device of this same type but exhibiting greater humidity resistance at above normal ambient temperatures is described and claimed in U.S. Pat. No. 3,990,832, Smialek et al, which features a particular stabilizer additive to preclude or reduce tendency of the silver source in the switch material from premature conversion to a low electrical resistance when exposed to ambient humidity conditions. In the preferred embodiments of both said disclosed flash lamp units, the specific switching arrangement comprises a pair of flash lamps, an electrical circuit into which said lamps are arranged to flash individually and in sequence, and a solid state radiation enery switch device being located adjacent one of said flash lamps and forming part of the electrical circuit, with each said switching device being located adjacent one of said flash lamps and disposed to receive radiant energy emitted by that flash lamp. The preferred switching device itself comprises a mass of the switch material being interconnected to a pair of spaced apart electrical terminals in the electrical circuit.

SUMMARY OF THE INVENTION

The present invention alleviates a serious problem still associated with present switch materials. More particularly, the conversion of the present switch material from a high to a low electrical resistance condition is sufficiently vigorous that the switching device is prone to being blown off the circuitboard and thereby fail to provide a low resistance path to the next unflashed lamp. It has now been discovered that incorporation of an electrically non-conductive inert particulate solid at certain proportions in the switch material composition can avoid or reduce this problem considerably along with providing still other unexpected advantages. More particularly, the presently improved switch material composition is capable of being applied to the circuitboard at a lesser thickness than heretofore experienced which effects an economy in the circuitboard construction. Additionally, the modification of the switch material composition in this manner effects further economy in reducing the relative proportion of silver source material otherwise needed and without significantly degrading desired properties of switch operation including humidity resistance, conversion sensitivity, and adhesion of the switch material before or after actuation.

Specifically, the presently improved switching material comprises an admixture having in approximate parts by weight: 50–75 parts of a carbon-containing silver salt, 10–30 parts silver oxide, 1–5 parts of an organic polymer binder, and 5–25 parts of a non-conductive particulate solid. This improved formulation may further contain 0.5–2 parts of a non-ionic surfactant to facilitate preparation of a liquid suspension of the switch material having improved rheological properties when deposited on the circuitboard member. Still further addition of a stabilizer additive in the present switch material to impart greater humidity resistance as taught in the aforementioned U.S. Pat. No. 3,990,832 has taught in the aforementioned U.S. Pat. No. 3,990,832 has proven useful although sufficient humidity resistance can be obtained without such modification if the switching devices are provided with the particular insulative adhesive coating disclosed in the further above referenced Ser. No. 751,537 application.

Preferred silver source materials for preparing the improved radiation switches of the present invention are essentially pure forms of silver oxide and a carbon-containing silver salt exhibiting sufficient sensitivity to conversion by the actinic radiation emitted from an adjacent flash lamp so that a mass of the converted switch material reliably provides an electrical interconnection between a pair of spaced apart electrical leads in the electrical circuit. In this regard, it has been found that if silver oxide provides the only silver source of the switch composition, there is likelihood of failure to provide the desired interconnection due to overly vigorous conversion or to form physical cracks in the mass of switch material which can lead to an open circuit condition. The preferred switch material composition thereby contains a mixture of silver oxide with a suitable carbon-containing silver salt in ratios wherein the silver salt represents the major weight portion of the mixture to ameliorate the greater violence of silver oxide when undergoing conversion in this manner. The useful carbon containing silver salts must be relatively stable under conditions of high humidity and elevated ambient temperature in order to provide a switch material which operates reliably after storage. Useful silver salts can be either organic or inorganic compounds and these include silver carbonate, silver pyruvate, silver acetylacetonate, silver acetate, silver oxylate, silver citrate, silver behenate, silver benzoate, and silver fumarate.

Useful binder materials for the present improved radiation switch devices can be selected from the class of humidity resistant organic polymers which can be employed in the form of a liquid medium for suspension and dispersion of the particulate solids in the switch material composition. The amount of organic polymer binder is preferably about 1–5 weight percent based on the silver source material in the switch composition. Useful binders include the cellulose esters such as cellulose nitrate and cellulose acetate butyrate; the cellulose ethers such as ethyl cellulose and ethyl hydroxyethyl cellulose; acrylates such as polymethylmethacrylate, polymethylacrylate, polycarbonate; and polystyrene as well as styrene copolymers such as the thermaoplastic block copolymer of styrene with butadiene.

Useful electrically non-conductive particulate solids for incorporation in the present improved switch composition can be further characterized in terms of both particle size and electrical resistivity. Particulated solids in the form of spheres, spheroids, or oblong spheroids are preferred, such as glass spheres or beads, having an average diameter of about 6–125 microns and preferably 10–50 microns average diameter. The specific electrical resistivity of the selected non-conductive particulate material should also be maintained at $10^{10}$ power ohm-centimeters or greater to avoid lowering the electrical conductivity below an acceptable level in the final switching device.

The optional non-ionic surfactant constituent in the present improved switch material composition can include polyoxyethylenes, ethoxylated alkylphenols, ethoxylated aliphatic alcohols, carboxylic esters, carboxylic block copolymers, and like materials. Such dispersing agents facilitate preparing a liquid suspension of the switch material composition which can be cured or dried to provide more reliable switching capability. In depositing the switches for a preferred circuitboard embodiment of the present invention wherein each switch is located between a pair of spaced apart electrical terminals on the circuitboard, conventional techniques may be used requiring an organic solvent. Useful solvents include pine oil, hydrocarbon fluids, esters, for example, an ether-ester etc., such as mixtures of hydrocarbons with alcohols which are conventionally used in silk screening. Such liquid coating mixture can be formed by mixing the silver source material with organic binder and solvent to form a slurry. This may be applied across the terminals by conventional means as a thin coating and the solvent thereafter evaporated to provide the final solid switch.

DESCRIPTION OF THE PREFERRED EMBODIMENTS

Figure 1:
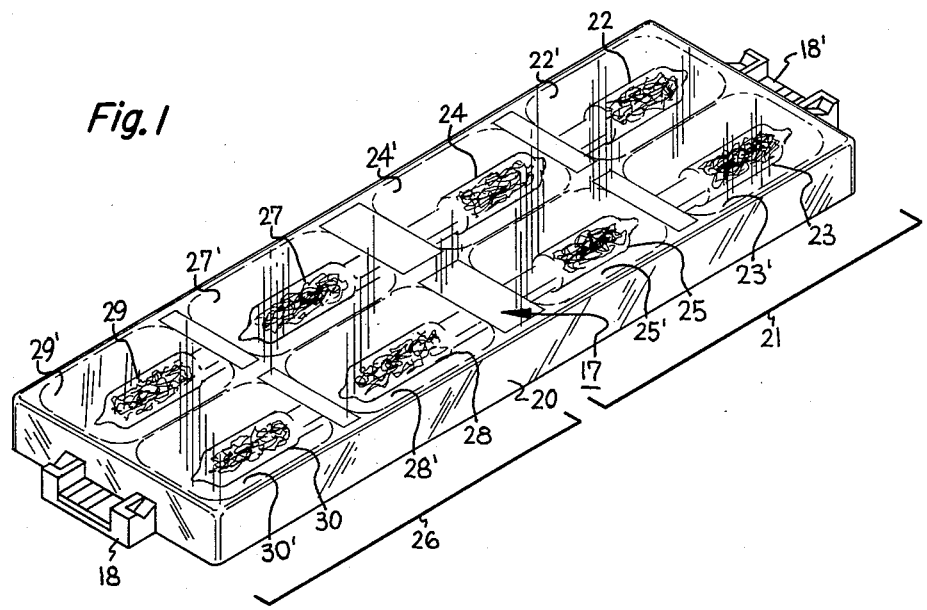
FIG. 1 is a perspective view of a multiple photoflash unit according to the present invention.

Referring now to the accompanying drawings, in the preferred embodiment illustrated in FIG. 1, a multiple flash lamp unit 17 is shown as being of the planar array type and containing a plurality of electrically fired flash lamps provided with a plug-in connector tab 18 at the lower side or end thereof adapted to fit directly into a camera. The lamp array 17 is also provided with a second plug-in connector tab 18′ at the top side or opposite end thereof whereby the array 17 is adapted to be attached to the camera in either of two orientations, i.e., with either the tab 18 or 18′ being plugged into the camera. Upon connecting this multiple flash array of a camera in these different orientations, it becomes possible to flash a group of lamps which is relatively further from the camera lens axis than are the other lamps of the array. More particularly, the first and second connector tab means for connecting the electrical circuit to a camera provides that only a first group of flash lamps can be flashed when the first connector means is connected to the camera and that only a second group of flash lamps can be flashed when the second connector means is connected to the camera. A camera containing flash activation means (not shown) couples to a pair of electrical terminals provided on the connector means of this particular circuitboard configuration whereupon electrical conductors in the circuit path enable the appropriate lamps to be flashed as hereinafter explained in greater detail.

The array 17 is provided with an upper group 21 of flash lamps 22, 23, 24 and 25 and a lower group 26 flash lamps 27, 28, 29 and 30. Reflectors 22′ – 25′ and 27′ – 30′ are disposed behind the respective flash lamps so that as each lamp is flashed, its light is projected forwardly of the array 17. As can be seen from the drawing, the reflector unit has a plurality of outwardly facing reflectors in linear rows arranged in side-by-side relationship and facing outwardly in the same direction. The individual flash lamps are mounted within the innermost part of an associated reflector. The relationship of each reflector to its associated lamp and the arrangement of a suitable plastic housing 20 providing cover means for said array may be generally that as disclosed in the above referenced patents and patent application. As will be seen more clearly in connection with the detailed description of the circuitboard member in FIG. 2, the four (4) lamps in the upper group 21 are connected to the lower plug-in tab 18, and the lower group 26 of lamps are connected to the upper plug-in tab 18′. It becomes thereby possible with such associated sequencing circuitry to flash the group of lamps relatively farthest from the lens axis of the camera.

Figure 2:
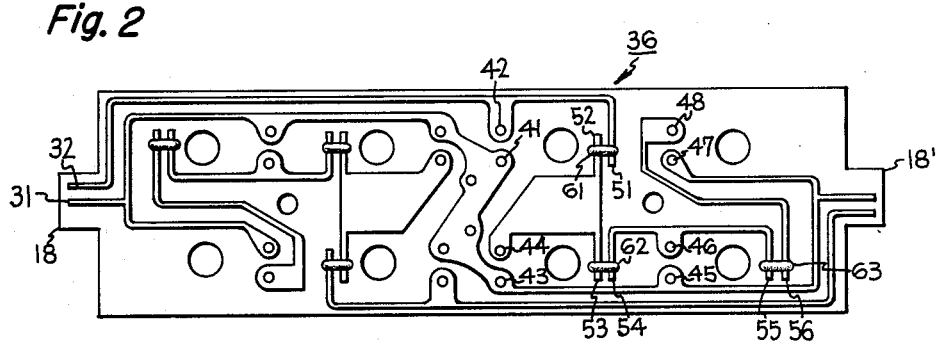
FIG. 2 is a top view of the circuitboard showing a series circuit arrangement of the associated electrical circuitry for a multiple flash lamp unit as illustrated in FIG. 1 which includes a switching device.

FIG. 2 shows a circuitboard 36 which is contained within the housing 20, said housing being in the form of a base to which light-transmitting cover means is secured to hold the entire assembly together. The circuitboard member is contained within the housing behind the reflectors 22′ etc. and provides support means for the flash lamps which are secured to the board by their lead-in wires (see FIG. 3) to provide the electrical circuitry for sequential firing of each group of lamps. The plug-in connector tabs 18 and 18′ may be formed integrally with the circuitboard 36 on the opposite ends thereof as shown. While an entire illustrative printed circuit is shown, only the portion of the printed circuit servicing the upper group 21 of lamps will be discussed in detail since the portion of the printed circuit servicing the lower group 26 as depicted is essentially the reverse mirror image thereof. The circuitboard 36 is considered from the point of view of being plugged into the camera (not shown) through the connector tab 18 whereby circuitboard terminals 31 and 32 make electrical contact with the flash activation means of the camera. The circuitboard terminal 31 is part of a continuous conductor run on the board which is connected to one electrical lead wire of all the flash lamps of a group and, for purposes of this description to the four (4) flash lamps 24, 25, 23 and 22 at points 41, 43, 45 and 47, respectively, by suitable means such as soldering, welding, or crimping. The second terminal 32 is part of a conductor run that is connected to the second lead wire of lamp 24 at point 42 and terminates at radiation switch terminal 51 which is close to, but spaced apart from, radiation switch terminal 52. Similar switch terminal pairs are located at 53–54 and 55–56. The second lead wires of lamps 25, 23 and 22 are attached to points 44, 46 and 48, respectively. Radiation switches 61, 62 and 63 are respectively positioned to be in contact with and bridge across the respective pair of switch terminals at 51-52, 53-54, and 55-56. Initially, all the switches are in the "off" condition which permits only the first bulb 24 in the sequence to be fired. The firing of any flashbulb turns the switch adjacent thereto to the "on" condition. Operated with lamps which become open-circuited upon flashing, the described circuit embodiment employs this static type switch means to sequence the next unflashed lamp in the group by means of a parallel connection of the lamps with the switch devices being connected in series with one another. The same result could be produced with the same type flash lamps being connected in parallel with respect to one another by having each switch device connected in series with a single lamp between the branch circuits of the flash lamps.

Figure 3:
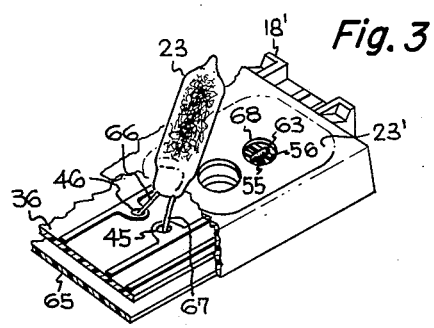
FIG. 3 is a three-dimensional broken-away view showing a single flash lamp at a slightly raised position and also showing the relationship between said lamp and the adjacent switch.

FIG. 3 illustrates a single flash lamp 23 in a slightly raised position with the transparent cover means removed to show the relative position between the lamp 23 and the switch 63 adjacent thereto below reflector 23'. The flash lamp 23 is attached to and supported by the printed circuitboard 36 through leads 66 and 67 at points 45 and 46, respectively. The switch 63 previously described in connection with FIG. 2 bridges switch terminal pair 55 and 56 and an opening 68 is provided in the reflector 23' between the bulb 23 and the switch 63 to facilitate radiation transfer.

When lamp 23 is disposed in its usual position shown in FIG. 1, a portion of the envelope of the lamp is located about 2 millimeters from the switch. As the lamp 23 is flashed, light and heat radiation is transmitted to the switch 63 and turns the switch from the off condition to the on condition by initiating a thermal chemical reaction.

Figure 4:
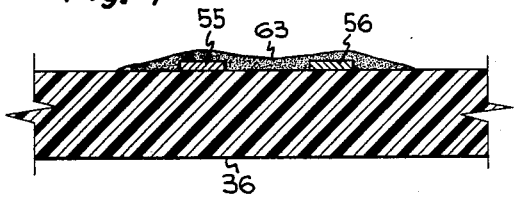
FIG. 4 is a cross-sectional view through a single switch and the connecting terminals shown in FIG. 3.

FIG. 4 shows an enlarged cross-section of the switch configuration in FIG. 3 wherein a mass of the switch material interconnects a pair of spaced-apart electrical terminals. In this embodiment, the switch terminals 55 and 56 are mounted on the circuitboard 36. The radiation switch 63 is applied to the circuitboard 36 as a coating in electrical contact with the terminals 55 and 56. Each of the radiation switches 61, 62 and 63 upon receiving heat and/or light radiation from the adjacent lamp when it is flashed, changes from an open circuit of high resistance to a closed circuit of low resistance thereby electrically connecting the switch terminals embedded therein so as to enable flashing to the next lamp in the sequence.

A preferred switch material composition in accordance with the present invention is now given to provide a further detailed illustration of the results achieved therewith. Accordingly, the coating mixture was prepared with 47.2 grams silver carbonate, 15.0 grams silver oxide, 1.2 grams of an acetylenic glycol type non-ionic surfactant, 12.0 grams of glass spheres, and 2.0 grams ethyl hydroxyethyl cellulose binder. Said mixture was prepared by dissolving the cellulose binder constituent in mixed organic solvents and dispersing the silver source materials and glass spheres therein with the surfactant. The coating mixture was in the form of a paste that was subsequently screen printed onto a polystyrene circuitboard substrate having already printed thereon the circuit conducting path. The switch elements were then dried in conventional fashion and exhibited an electrical resistance value of approximately 1 $\times$ $10^{10}$ ohms in the off condition. The switch elements were tested for flashing sensitivity by the flashing of an adjacent high-voltage type flashlamp located approximately ½ inch from the switch surface. All switches converted to an electrical resistance less than 100 ohms upon actuation as indicated.

While preferred embodiments of the present invention have been shown and described, various other embodiments and modifications thereof will be apparent to persons skilled in the art and thereby fall within the scope of the invention defined in the following claims.

What I claim as new and desire to secure by Letters Patent of the U.S. is:

1. A radiation switch for a flash lamp unit comprising an admixture material having in approximate parts by weight: 50–75 parts of a carbon-containing silver salt, 10–30 parts silver oxide, 1–5 parts of an organic polymer binder, and 5–25 parts of an electrically non-conductive inert particulate solid.

2. A composition as in claim 1 which further contains 0.5–2.0 parts of a non-ionic surfactant.

3. A composition as in claim 1 wherein the carbon containing silver salt is silver carbonate.

4. A composition as in claim 1 wherein the non-conductive particulate solid comprises glass beads.

5. In a flash lamp unit comprising a pair of flash lamps, an electrical circuit into which said lamps are arranged to flash individually and in sequence, and a solid state radiation energy switch device located adjacent one of said flash lamps and forming part of the electrical circuit, said switch device being located adjacent one of said flash lamps and disposed to receive radiant energy emitted by that flash lamp, the improvement wherein said radiation switch comprises an admixture material having in approximate parts by weight: 50–75 parts of a carbon containing silver salt, 10–30 parts silver oxide, 1–5 parts of an organic polymer binder, and 5–25 parts of an electrically non-conductive inert particulate solid.

6. The flash lamp unit of claim 5 wherein the switch device comprises a mass of said material interconnected to a pair of spaced apart electrical terminals in the electrical circuit.

7. The flash lamp unit of claim 6 wherein the carbon containing silver salt is silver carbonate and the material further contains 0.5–2.0 parts of a non-ionic surfactant.

8. The flash lamp unit of claim 7 wherein the organic polymer binder is selected from the group consisting of cellulose esters, cellulose ethers, polyalkylacrylates, polyalkylmethacrylates, polymethylmethacrylate, polymethylacrylate, polystyrene and polycarbonate.

9. The flash lamp unit of claim 8 wherein the nonionic surfactant is selected from the group consisting of polyoxyethylenes, ethoxylated alkyl phenols, ethoxylated aliphatic alcohols, carboxylic esters, and carboxylic block copolymers.

10. The flash lamp unit of claim 9 wherein the nonconductive particulate solid comprises glass beads.

* * * * *